(12) United States Patent
Wang et al.

(10) Patent No.: US 6,838,410 B2
(45) Date of Patent: Jan. 4, 2005

(54) CATALYSTS FOR MAKING POLYOLEFINS

(75) Inventors: Shaotian Wang, Mason, OH (US); Clifford C. Lee, Pearland, TX (US); Mark P. Mack, West Chester, OH (US); Gregory G. Hlatky, Morrow, OH (US); Sandor Nagy, Naperville, IL (US); Barbara M. Tsuie, Cincinnati, OH (US); Craig C. Meverden, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 57 days.

(21) Appl. No.: 10/382,233

(22) Filed: Mar. 5, 2003

(65) Prior Publication Data

US 2004/0023791 A1 Feb. 5, 2004

Related U.S. Application Data

(63) Continuation-in-part of application No. 10/211,085, filed on Aug. 2, 2002, now Pat. No. 6,559,251.

(51) Int. Cl.$^7$ .......................... B01J 31/00; B01J 37/00; C08F 4/02; C08F 4/60

(52) U.S. Cl. ...................... 502/103; 502/104; 502/202; 502/232

(58) Field of Search ................. 502/103, 104, 502/202, 232

(56) References Cited

U.S. PATENT DOCUMENTS

| | | | |
|---|---|---|---|
| 5,064,802 A | 11/1991 | Stevens et al. | 502/155 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,495,035 A | 2/1996 | Jordan et al. | 556/1 |
| 5,539,124 A | 7/1996 | Etherton et al. | 548/402 |
| 5,637,659 A | 6/1997 | Krishnamurti et al. | 526/133 |
| 5,648,440 A | 7/1997 | Sugano et al. | 526/132 |
| 5,902,866 A | 5/1999 | Nagy et al. | 526/133 |
| 6,211,311 B1 | 4/2001 | Wang et al. | 526/131 |
| 6,232,260 B1 | 5/2001 | Nagy et al. | 502/155 |
| 6,559,251 B1 * | 5/2003 | Wang et al. | 526/127 |
| 6,583,242 B2 * | 6/2003 | Wang et al. | 526/161 |
| 6,596,826 B1 * | 7/2003 | Nagy | 526/134 |
| 6,608,224 B2 * | 8/2003 | Resconi et al. | 556/27 |
| 6,613,712 B1 * | 9/2003 | McDaniel et al. | 502/104 |
| 6,630,547 B1 * | 10/2003 | Lynch et al. | 526/128 |
| 6,653,416 B2 * | 11/2003 | McDaniel et al. | 526/160 |
| 6,673,880 B2 * | 1/2004 | Schaverien et al. | 526/113 |
| 6,693,156 B1 * | 2/2004 | Resconi | 526/165 |
| 6,703,338 B2 * | 3/2004 | Holtcamp et al. | 502/123 |
| 6,730,754 B2 * | 5/2004 | Resconi et al. | 526/129 |

FOREIGN PATENT DOCUMENTS

| | | |
|---|---|---|
| WO | WO 99/24446 | 5/1999 |
| WO | WO 01/53360 | 7/2001 |

OTHER PUBLICATIONS

US 2004/0106514 A1 (Nagy et al) Jun. 3, 2004.*
US 2003/0032744 A1 (Nagy et al) Feb. 13, 2003.*
Buu–Hoi and Xuong, *J. Chem. Soc.* (1952) 2225.
*J. Am. Chem. Soc.* 118 (1996) 8024.
*Organometallics* 15 (1996) 4045.

* cited by examiner

Primary Examiner—Mark L. Bell
Assistant Examiner—Jennine Brown
(74) Attorney, Agent, or Firm—Jonathan L. Schuchardt

(57) ABSTRACT

A process for making ethylene copolymers is disclosed. Ethylene copolymerizes with an α-olefin in the presence of a catalyst system comprising an activator and a silica-supported, bridged indenoindolyl metal complex having "open architecture." The supported complex incorporates comonomers with exceptional efficiency, and the process gives ethylene copolymers having high molecular weights (Mw>100K) and very low densities (<0.910 g/cm$^3$). Open architecture catalysts that include bridging through the indolyl nitrogen of the indenoindolyl framework are also described. Additionally, supported and unsupported indeno[1,2-b]indolyl catalysts provide exceptional activities in the preparation of elastomeric polypropylene and ethylene copolymers.

7 Claims, No Drawings

CATALYSTS FOR MAKING POLYOLEFINS

CROSS-REFERENCE TO RELATED APPLICATION

This is a continuation-in-part of application Ser. No. 10/211,085, filed Aug. 2, 2002 now U.S. Pat. No. 5,559,251, now allowed.

FIELD OF THE INVENTION

The invention relates to a process for making polyolefins. The process, which uses catalysts having a bridged indenoindolyl ligand with "open architecture," is valuable for making polyolefins with exceptionally low densities.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Single-site olefin polymerization catalysts having "open architecture" are generally known. Examples include the so-called "constrained geometry" catalysts developed by scientists at Dow Chemical Company (see, e.g., U.S. Pat. No. 5,064,802), which have been used to produce a variety of polyolefins. "Open architecture" catalysts differ structurally from ordinary bridged metallocenes, which have a bridged pair of pi-electron donors. In open architecture catalysts, only one group of the bridged ligand donates pi electrons to the metal; the other group is sigma bonded to the metal. An advantage of this type of bridging is thought to be a more open or exposed locus for olefin complexation and chain propagation when the complex becomes catalytically active. Simple examples of complexes with open architecture are tert-butylamido(cyclopentadienyl)dimethylsilylzirconium dichloride and methylamido (cyclopentadienyl)-1,2-ethanediyltitanium dimethyl:

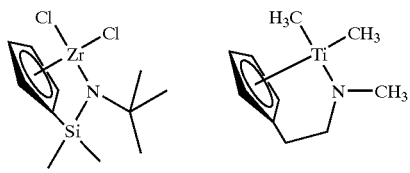

Organometallic complexes that incorporate "indenoindolyl" ligands are known (see U.S. Pat. No. 6,232,260 and PCT Int. Appl. WO 99/24446 ("Nifant'ev")). The '260 patent demonstrates the use of non-bridged bis(indenoindolyl) complexes for making HDPE in a slurry polymerization. Versatility is an advantage of the complexes; by modifying the starting materials, a wide variety of indenoindolyl complexes can be prepared. "Open architecture" complexes are neither prepared nor specifically discussed. Nifant'ev teaches the use of bridged indenoindolyl complexes as catalysts for making polyolefins, including polypropylene, HDPE and LLDPE. The complexes disclosed by Nifant'ev do not have open architecture.

PCT Int. Appl. WO 01/53360 (Resconi et al.) discloses bridged indenoindolyl complexes having open architecture and their use to produce substantially amorphous propylene-based polymers. Resconi teaches many open architecture complexes but none that are bridged through the indolyl nitrogen. Moreover, all of the complexes are used only to make propylene polymers; their use to produce low-density ethylene polymers is not disclosed. Resconi's teachings are also limited to indeno[2,1-b]indolyl complexes; the reference includes no disclosure of indeno[1,2-b]indolyl complexes or their use for making propylene polymers.

As noted earlier, the indenoindolyl framework is versatile. The need continues, however, for new ways to make polyolefins—especially ethylene copolymers—with very low densities. In particular, it is difficult to make ethylene polymers having densities less than about 0.915 g/cm³ using known indenoindolyl complexes. On the other hand, ethylene polymers having such low densities are valuable for special applications requiring elastomeric properties. The industry would also benefit from the availability of new catalysts that capitalize on the inherent flexibility of the indenoindolyl framework.

SUMMARY OF THE INVENTION

The invention is a process for making ethylene copolymers. The process comprises copolymerizing ethylene with an α-olefin in the presence of a catalyst system comprising an activator and a silica-supported organometallic complex. The complex, which has "open architecture," includes a Group 4 to 6 transition metal and a bridged indenoindolyl ligand. Because the supported complex incorporates comonomers with exceptional efficiency, the process enables the production of ethylene copolymers having high molecular weights (Mw>100K) and very low densities (<0.910 g/cm³). The invention includes new open architecture catalysts that take advantage of bridging through the indolyl nitrogen of the indenoindolyl framework.

The invention also includes catalysts based on open architecture indeno[1,2-b]indolyl complexes. We found that supported and unsupported varieties of these catalysts are exceptionally valuable for making elastomeric polypropylenes and ethylene copolymers.

DETAILED DESCRIPTION OF THE INVENTION

In the process of the invention, ethylene polymerizes with one or more α-olefins to give a copolymer having very low density. Suitable α-olefins are 1-butene, 1-hexene, 1-octene, and mixtures thereof. 1-Hexene is particularly preferred.

Catalyst systems useful for the process comprise an activator and a silica-supported, indenoindolyl Group 4–6 transition metal complex having open architecture. More preferred complexes include a Group 4 transition metal such as titanium or zirconium.

"Indenoindolyl" ligands are generated by deprotonating an indenoindole compound using a potent base. By "indenoindole compound," we mean an organic compound that has both indole and indene rings. The five-membered rings from each are fused, i.e., they share two carbon atoms. Preferably, the rings are fused such that the indole nitrogen and the only sp³-hybridized carbon on the indenyl ring are "trans" to each other. Such is the case in an indeno[1,2-b] ring system such as:

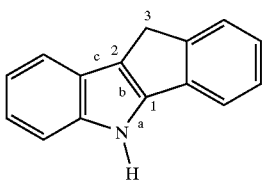

Suitable ring systems also include those in which the indole nitrogen and the sp³-hybridized carbon of the indene are beta to each other, i.e., they are on the same side of the molecule. This is an indeno[2,1-b]indole ring system:

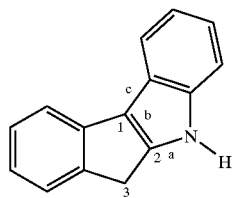

The ring atoms can be unsubstituted or substituted with one or more groups such as alkyl, aryl, aralkyl, halogen, silyl, nitro, dialkylamino, diarylamino, alkoxy, aryloxy, thioether, or the like. Additional fused rings can be present, as long as an indenoindole moiety is present.

Numbering of indenoindoles follows IUPAC Rule A-22. The molecule is oriented as shown below, and numbering is done clockwise beginning with the ring at the uppermost right of the structure in a manner effective to give the lowest possible number to the heteroatom. Thus, 5,10-dihydroindeno[1,2-b]indole is numbered as follows:

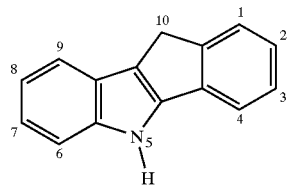

while 5,6-dihydroindeno[2,1-b]indole has the numbering:

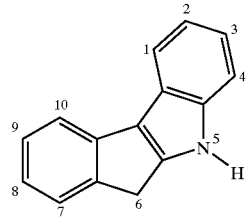

For correct nomenclature and numbering of these ring systems, see the *Ring Systems Handbook* (1998), a publication of Chemical Abstracts Service, Ring Systems File II: RF 33986-RF 66391 at RF 58952 and 58955. (Other examples of correct numbering appear in PCT Int. Appl. WO 99/24446.)

Methods for making indenoindole compounds are well known. Suitable methods and compounds are disclosed, for example, in U.S. Pat. No. 6,232,260, the teachings of which are incorporated herein by reference, and references cited therein, including the method of Buu-Hoi and Xuong, *J. Chem. Soc.* (1952) 2225. Suitable procedures also appear in PCT Int. Appls. WO 99/24446 and WO 01/53360.

Indenoindolyl complexes useful for the process of the invention have open architecture. By "open architecture," we mean a complex having a fixed geometry that enables generation of a highly exposed active site when the catalyst is combined with an activator. The metal of the complex is pi-bonded to the indenyl Cp ring and is also sigma-bonded through two or more atoms to the indolyl nitrogen or the indenyl methylene carbon. (In contrast, many of the bridged indenoindolyl complexes described in the literature have a transition metal that is pi-bonded to the indenyl Cp ring and pi-bonded to another Cp-like group. See, e.g., U.S. Pat. No. 6,232,260 or WO 99/24446). Preferably, the metal is sigma-bonded to a heteroatom, i.e., oxygen, nitrogen, phosphorus, or sulfur; most preferably, the metal is sigma-bonded to nitrogen. The heteroatom is linked to the indenoindolyl group through a bridging group, which is preferably dialkylsilyl, diarylsilyl, methylene, ethylene, isopropylidene, diphenylmethylene, or the like. Particularly preferred bridging groups are dimethylsilyl, methylene, ethylene, and isopropylidene. The bridging group is covalently bonded to either the indolyl nitrogen atom or the indenyl methylene carbon.

In addition to the bridged indenoindolyl ligand, the organometallic complex usually includes one or more labile anionic ligands such as halides, alkoxys, aryloxys, alkyls, alkaryls, aryls, dialkylaminos, or the like. Particularly preferred are halides, alkyls, and alkaryls (e.g., chloride, methyl, benzyl).

In a preferred process of the invention, the indenoindolyl complex has the general structure:

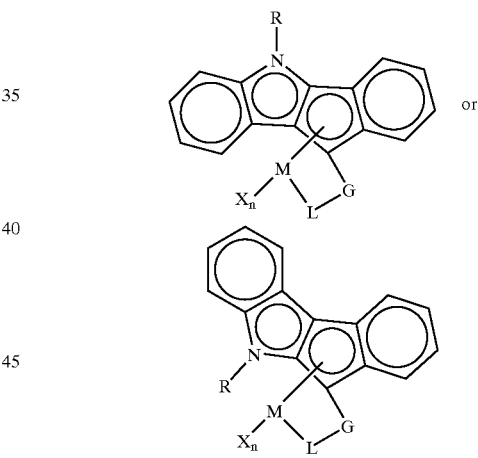

in which M is a Group 4–6 transition metal, G is a linking group, L is a ligand that is covalently bonded to G and M, R is alkyl, aryl, or trialkylsilyl, X is alkyl, aryl, alkoxy, aryloxy, halide, dialkylamino, or siloxy, and n satisfies the valence of M. More preferably, M is a Group 4 transition metal, L is alkylamido, G is dialkylsilyl, and X is halide or alkyl.

In another preferred process, the indenoindolyl complex has the general structure:

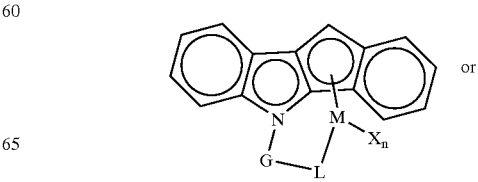

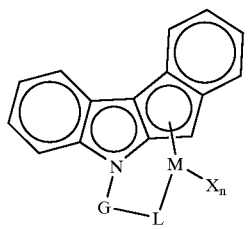

in which M is a Group 4–6 transition metal, G is a linking group, L is a ligand that is covalently bonded to G and M, X is alkyl, aryl, alkoxy, aryloxy, halide, dialkylamino, or siloxy, and n satisfies the valence of M. Preferably, M is a Group 4 transition metal, L is alkylamido, G is dialkylsilyl, and X is halide or alkyl.

Exemplary organometallic complexes useful for the process of the invention:

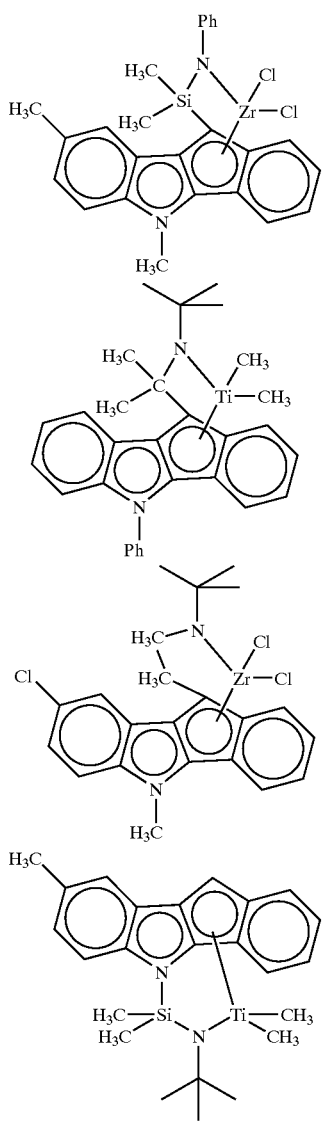

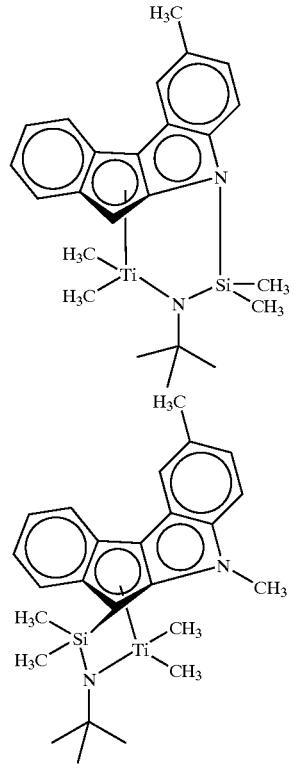

The complexes can be made by any suitable method, those skilled in the art will recognize a variety of acceptable synthetic strategies. See especially PCT Int. Appl. WO 01/53360 for suitable routes. Often, the synthesis begins with preparation of the desired indenoindole compound from particular indanone and arylhydrazine precursors. In one convenient approach, the indenoindole is deprotonated and reacted with dichlorodimethylsilane to attach a chlorodimethylsilyl group to the indenyl methylene carbon. Subsequent reaction with an amine or, more preferably, an alkali metal amide compound such as lithium tert-butylamide (from tert-butylamine and n-butyllithium), displaces chloride and gives the desired silylamine product. Double deprotonation and reaction with a transition metal source gives the target indenoindolyl metal complex having open architecture. A typical reaction sequence follows:

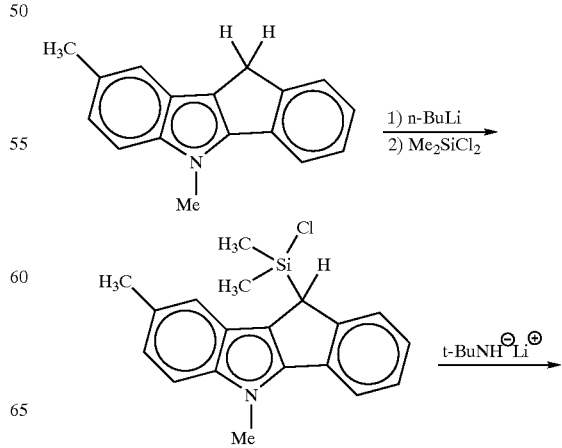

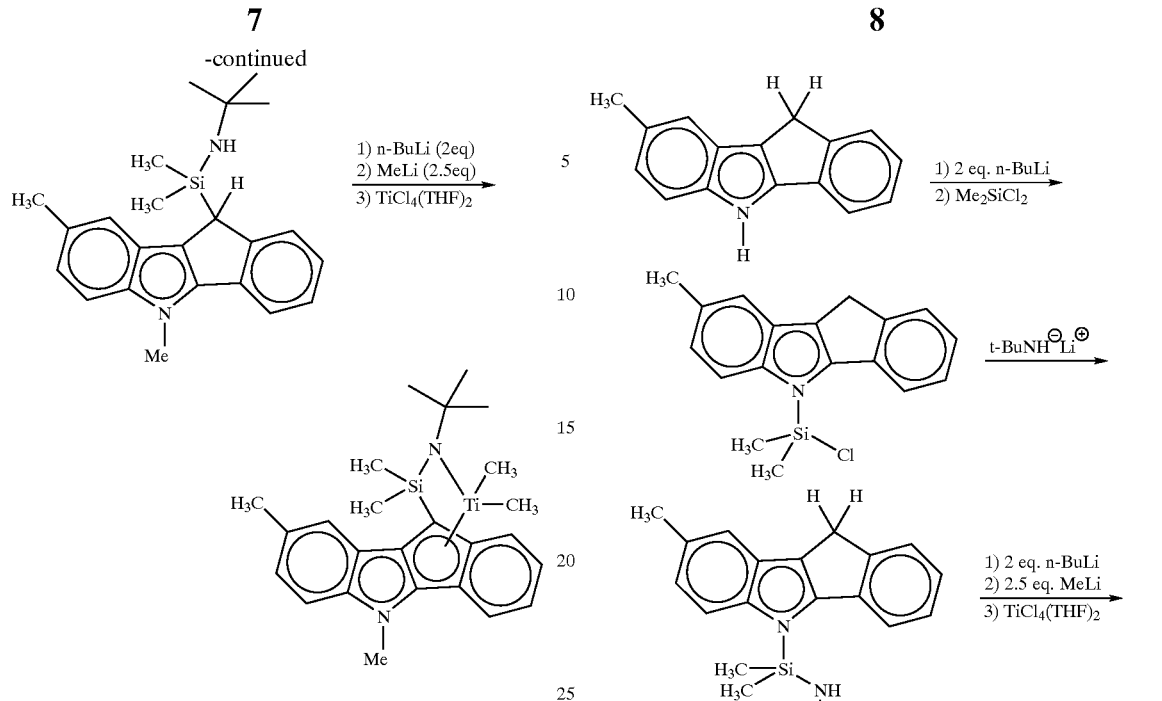

A similar complex can be generated by amine elimination, which may or may not require heating, with a method explored by Professor Richard F. Jordan and coworkers at the University of Iowa:

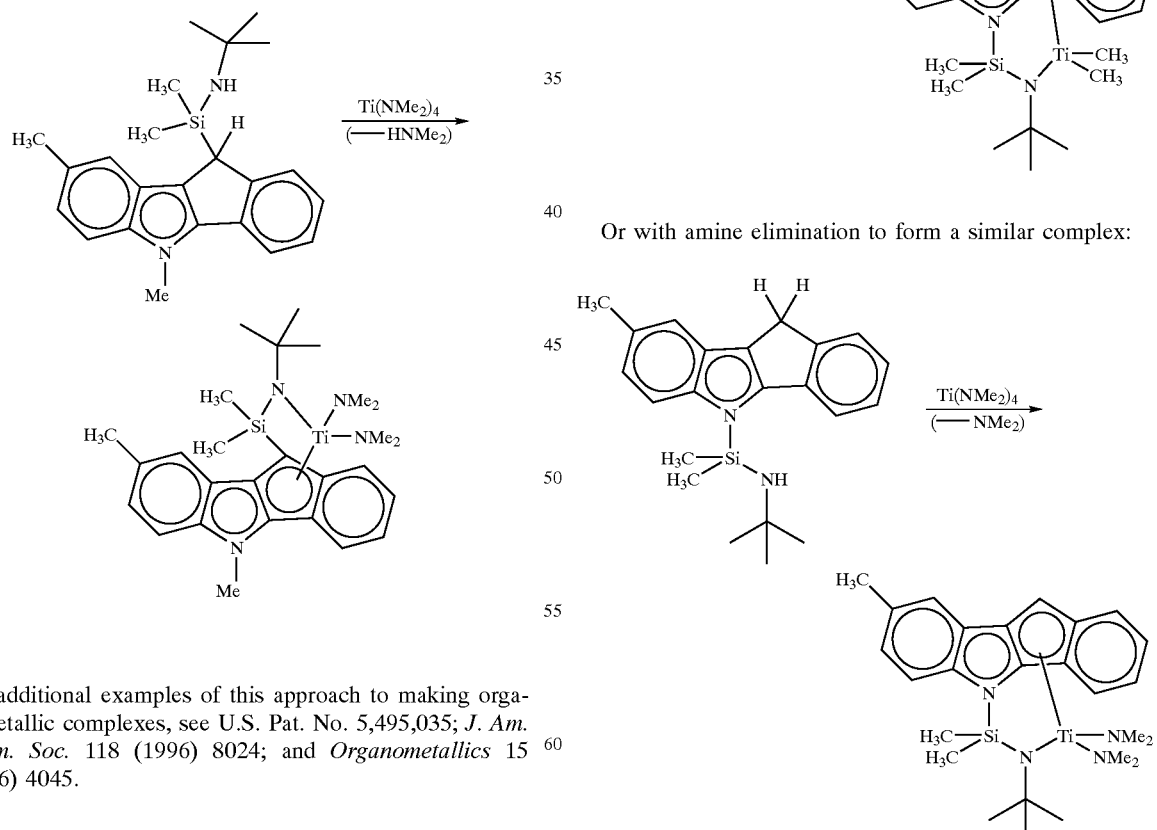

For additional examples of this approach to making organometallic complexes, see U.S. Pat. No. 5,495,035; *J. Am. Chem. Soc.* 118 (1996) 8024; and *Organometallics* 15 (1996) 4045.

The process of the invention can also utilize complexes in which bridging to the indenoindolyl group occurs through the indolyl nitrogen atom. A convenient route to an N—Si—N bridged complex is shown below:

Or with amine elimination to form a similar complex:

Similar strategies can be used to make a wide variety of indenoindolyl metal complexes having open architecture.

Any convenient source of the transition metal can be used to make the complex. As shown above, the transition metal source conveniently has labile ligands such as halide or dialkylamino groups that can be easily replaced by the indenoindolyl and amido anions of the bridged indenoindolyl ligand. Examples are halides (e.g., TiCl$_4$, ZrCl$_4$), alkoxides, amides, and the like.

Catalyst systems useful in the process include, in addition to the indenoindolyl metal complex, an activator. The activator helps to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 500 moles, of activator per mole of M. The activator can be combined with the complex and added to the reactor as a mixture, or the components can be added to the reactor separately.

The process uses a silica-supported catalyst system. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference.

While there are many ways to practice the ethylene copolymerization process of the invention, the process is preferably a slurry or gas-phase process. These processes are well-suited to the use of supported catalysts. Suitable methods for polymerizing olefins using the catalysts of the invention are described, for example, in U.S. Pat. Nos. 5,902,866, 5,637,659, and 5,539,124, the teachings of which are incorporated herein by reference.

The polymerizations can be performed over a wide temperature range, such as about −30° C. to about 280° C. A more preferred range is from about 30° C. to about 180° C.; most preferred is the range from about 60° C. to about 100° C. Olefin partial pressures normally range from about 15 psia to about 50,000 psia. More preferred is the range from about 15 psia to about 1000 psia.

Catalyst concentrations used for the olefin polymerization depend on many factors. Preferably, however, the concentration ranges from about 0.01 micromoles per liter to about 100 micromoles per liter. Polymerization times depend on the type of process, the catalyst concentration, and other factors. Generally, polymerizations are complete within several seconds to several hours.

The invention includes a catalyst system. The catalyst system comprises an activator, as described above, and a bridged indenoindolyl Group 4–6 transition metal complex. The complex has an open architecture in which bridging to the indenoindolyl group occurs through the indolyl nitrogen. The complexes are produced as described earlier. In preferred catalyst systems of the invention, the indenoindolyl complex has the general structure:

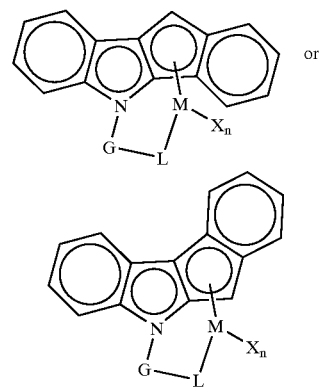

in which M is a Group 4–6 transition metal, G is a linking group, L is a ligand that is covalently bonded to G and M, X is alkyl, aryl, alkoxy, aryloxy, halide, dialkylamino, or siloxy, and n satisfies the valence of M. Preferably, M is a Group 4 transition metal, L is alkylamido, G is dialkylsilyl, and X is halide or alkyl.

Exemplary indenoindolyl complexes for catalyst systems of the invention:

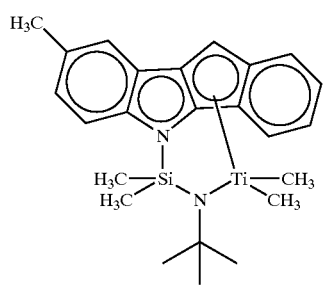

-continued

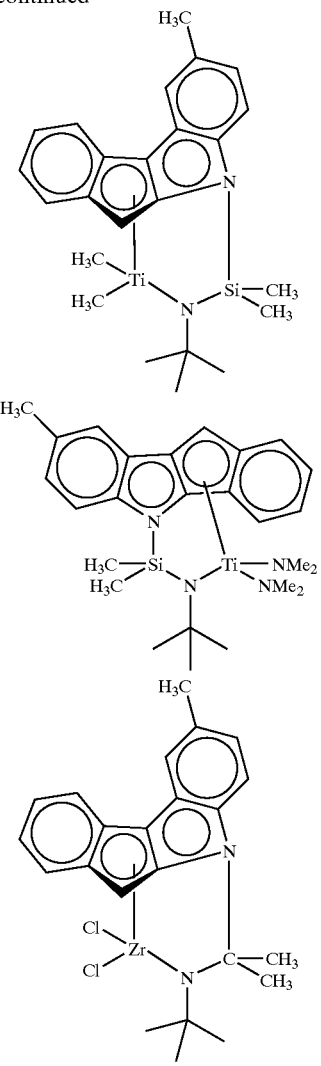

The invention enables the preparation of ethylene copolymers having very low densities. Generally, the copolymers can have densities less than about 0.930 g/cm³. An advantage of the invention, however, is the ability to depress densities to much lower values, i.e., less than 0.910 g/cm³, and even less than 0.890 g/cm³. As shown in Table 1, achieving very low densities is difficult for indenoindolyl metal catalysts that lack an open architecture (see Comparative Examples 2 and 3). We found that an open architecture catalyst incorporates comonomers more efficiently (see Example 1).

The catalyst system and process of the invention can be used to produce ethylene polymers having high molecular weights. For example, very low density polyolefins having weight average molecular weights (Mw) greater than 400,000, or even greater than 1,000,000, can be easily produced (see Example 4). When desirable, hydrogen or other chain-transfer agents can be introduced into the reactor to regulate polymer molecular weight.

Polyolefins produced by the process of the invention usually have narrow molecular weight distributions, preferably less than about 3.5, more preferably less than about 3.0. When a comonomer is included, a high level of short-chain branching is evident by FT-IR analysis. When the goal is to make polyolefins with very low density, the copolymers have more then about 20, preferably more than about 30, branches per 1000 carbons.

In another aspect, the invention is a catalyst system useful for making elastomeric polypropylene and ethylene copolymers. The catalyst system comprises an activator and a bridged indeno[1,2-b]indolyl Group 4–6 transition metal complex having open architecture. We surprisingly found that the bridged [1,2-b] complexes are much more active than their counterpart [2,1-b] complexes in both propylene polymerizations and ethylene copolymerizations.

Activators useful in these catalyst systems are the same ones described earlier. The complex includes a bridged indeno[1,2-b]indolyl ligand and a Group 4–6, preferably a Group 4, transition metal. Suitable indeno[1,2-b]indolyl complexes have already been described. As shown below in the preparation of complex 4, the indeno[1,2-b]indolyl ligands are conveniently prepared by reacting arylhydrazines and 1-indanones. Preferred indeno[1,2-b]indolyl complexes have the structure:

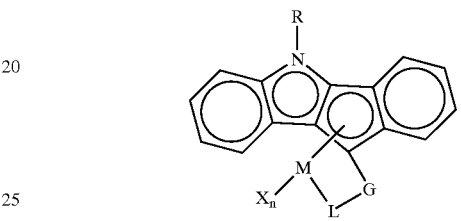

in which M is a Group 4–6 transition metal, G is a linking group, L is a ligand that is covalently bonded to G and M, R is alkyl, aryl, or trialkylsilyl, X is alkyl, aryl, alkoxy, aryloxy, halide, dialkylamino, or siloxy, and n satisfies the valence of M. More preferably, M is a Group 4 transition metal, L is alkylamido, G is dialkylsilyl, and X is halide or alkyl Methods for preparing the complexes and exemplary structures have already been described. Complex 4 (below) and its method of preparation are illustrative.

Indeno[1,2-b]indolyl complexes are exceptionally useful for making elastomeric polypropylene. While both the [1,2-b] and [2,1-b] complexes give polypropylene with elastomeric properties (i.e., the resulting polymers are neither highly isotactic nor highly syndiotactic), the unsupported [1,2-b] complexes are an order of magnitude (about 10 times) more active at the same reaction temperature than their [2,1-b] counterparts in propylene polymerizations (see Table 3). A similar activity advantage in propylene polymerizations is seen with supported indeno[1,2-b]indolyl complexes (see Example 20 and Comparative Example 21).

Similar results are achieved in copolymerizations of ethylene with alpha-olefins. As shown in Example 18 and Comparative Example 19, supported indeno[1,2-b]indolyl complexes with open architecture have three times the activity of their [2,1-b] counterparts in copolymerizations of ethylene and 1-hexene.

The following examples merely illustrate the invention. Those skilled in the art will recognize many variations that are within the spirit of the invention and scope of the claims.

PREPARATION OF COMPLEX A

Open Architecture Complex 4

(a) Preparation of Indeno[1,2-b]indole 1

A mixture of 1-indanone (30.6 g, 232 mmol) and p-tolylhydrazine hydrochloride (37.0 g, 233 mmol) in EtOH (350 mL) and aqueous HCl (12 N, 18 mL) are heated to reflux for 90 min. The mixture is cooled and filtered, and the solid is washed with EtOH (600 mL) followed by 20% aqueous EtOH (400 mL) and finally hexanes (200 mL). The off-white solid is dried under vacuum (36.5 g, 72%).

(b) N-Methylation of 1

A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of MeI (17.0 mL, 273 mmol) in toluene (15 mL) is added dropwise, and the mixture is stirred at room temperature for 4 h and refluxed for 3 h. A crystalline solid forms upon cooling and is filtered and washed with cold (−78° C.) EtOH (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Bridged Ligand Preparation (3)

n-Butyllithium (8 mL, 2.5 M in hexane, 20 mmol) is added dropwise to a solution of 2 (4.66 g, 21 mmol) in dry ether (70 mL). After 2 h, this solution is slowly added to a solution of dichlorodimethylsilane (5.20 g) in ether (30 mL). After 2 h of stirring at room temperature, the mixture is filtered and evaporated. The residue is redissolved in ether (60 mL), and an ethereal solution of lithium t-butylamide (prepared in the usual manner from t-butylamine (1.46 g) and n-butyllithium (8 mL of 2.5 M solution)) is added dropwise. The mixture is stirred for 3 h, and is then filtered through Celite filter aid. After concentrating the filtrate, the residue is collected with pentane and chilled to −30° C. Yield of bridged ligand 3: 6 g (82%).

(d) Preparation of Open Architecture Complex 4

Bridged ligand 3 (6 g) is dissolved in ether (120 mL) and n-butyllithium (13.5 mL of 2.5 M solution in hexane) is added. After stirring overnight at room temperature, methyllithium (24.5 mL of 1.4 M solution in ether) is added, and the mixture is cooled to −30° C. Titanium tetrachloride bis(tetrahydrofuran) complex (5.66 g) is added, and stirring continues for 3 h. The mixture is filtered and the filtrate is concentrated. The residue is extracted with hot heptane (2×100 mL). The combined filtrates are evaporated, and the residue is crystallized with pentane and cooled to −30° C. The product, complex 4, is a dark brown solid. Yield: 4.67 g.

The $^1$H NMR spectrum is consistent with the proposed structure:

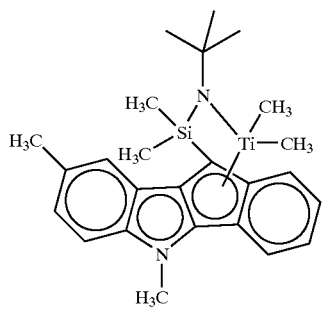

4

PREPARATION OF COMPLEX B

Comparative Example

Bridged Indeno[2,1-b]indolylzirconium Complex 9

(a) Preparation of Indeno[2,1-b]indole 5

A mixture of 2-indanone (51.0 g, 0.39 mol) and p-tolylhydrazine hydrochloride (61.4 g, 0.39 mol) is dissolved in glacial acetic acid (525 mL) and is vigorously stirred and heated to reflux. The mixture turns red and is heated for 2 h. After cooling to room temperature, it is poured into ice water (1 L). The precipitate is filtered to afford a solid, which is washed with water (about 1 L). The solid is dissolved in ethyl acetate (1.4 L), activated charcoal is added, and the mixture is gently warmed. The mixture is then cooled and filtered over a pad of Celite. The filtrate is dried over $Na_2SO_4$ filtered, and is then concentrated to 450 mL and cooled to −30° C. for 3 days. The crystalline solid is filtered and washed with chilled (−78° C.) hexanes (2×500 mL). The beige solid is collected and dried under vacuum (47.1 g, 56%).

(b) N-Methylation of 5 to Give 6

A slurry of aqueous NaOH (42 mL, 21.5 M, 903 mmol), $C_{16}H_{33}NMe_3Br$ (0.36 g, 0.97 mmol), and 5 (15.0 g, 68.4 mmol) is combined with toluene (50 mL). A solution of MeI (8.0 mL, 129 mmol) in toluene (15 mL) is added dropwise at room temperature. The mixture is stirred at room temperature for 2.5 h and then refluxed for an hour. The mixture turns red and is cooled to room temperature and filtered. The crystalline solid is washed with chilled (−30° C.) EtOH (200 mL) followed by chilled hexanes (200 mL) to afford a pale red solid (10.3 g, 65%).

(c) Anion Generation: Preparation of 7 n-Butyllithium (13.0 mL, 2.5 M in hexanes, 32.5 mmol) is added at room temperature to a slurry of 6 (4.94 g, 21.1 mmol) in toluene (125 mL). The mixture is maintained at room temperature and turns pale yellow. A precipitate forms after 2 h. After 2 days, the mixture is filtered to give a pale beige solid. The solid is washed with toluene (60 mL), followed by hexanes (30 mL), and is then collected and dried under vacuum (4.37 g, 87%).

(d) Preparation of Dianion 8

Product 7 (4.57 g, 19.1 mmol) is suspended in toluene (100 mL). Diethyl ether (40 mL) is added dropwise to afford an orange solution, which is added to a solution of $SiCl_2Me_2$ (12.0 mL, 98.9 mmol) in $Et_2O$ (100 mL) at room temperature. The mixture turns cloudy and dirty beige and is stirred for 3 days and filtered to give a dark red-orange solution. Volatiles are removed under reduced pressure to afford an oily solid. An aliquot is analyzed by $^1$H NMR, revealing formation of the desired product; 100% conversion is presumed. The oily solid is dissolved in $Et_2O$ (140 mL), and NaCp (11.0 mL, 2.0 M in THF, 22 mmol) is added. A precipitate forms immediately, and stirring continues for 2 days. The mixture is washed with water (3×50 mL), and the organic phase is dried over $Na_2SO_4$ and filtered. Volatiles are removed under vacuum to give an oily residue, and 100% conversion is assumed. The residue was dissolved in $Et_2O$ (75 mL) and cooled to −78° C. n-Butyllithium (18.0 mL, 2.5 M in hexanes, 45.0 mmol) is added by syringe, and the mixture is warmed to room temperature slowly. A yellow solid precipitates overnight, and volatiles are removed under vacuum. The crude material is washed with hexanes (100 mL) and filtered to afford a yellow powder. The powder is collected and dried under vacuum (6.73 g, 93%).

(e) Preparation of Complex 9

Zirconium tetrachloride (3.15 g, 13.5 mmol) is combined with toluene (100 mL) and dissolved in $Et_2O$ (50 mL) to produce a cloudy suspension. Dianion 8 (5.02 g, 13.7 mmol) is added as a solid in portions over the course of 30 min. The color turns from yellow to dark orange, and a precipitate forms. The mixture is maintained at room temperature for 2 days and is filtered to give a dirty yellow solid. The solid is washed with toluene (50 mL) and hexanes (50 mL). The yellow powder is collected and dried under vacuum (3.72 g, 53%).

The $^1$H NMR spectrum is consistent with the proposed structure:

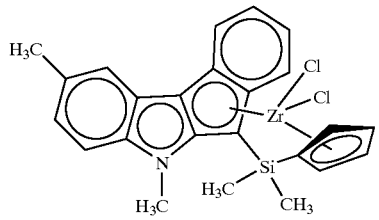

PREPARATION OF COMPLEX C

Comparative Example

Unbridged Indeno[1,2-b]indolylzirconium Complex 10

In a glovebox under nitrogen, N-methylated indeno[1,2-b]indole 2 (14.2 g, 60.9 mmol), prepared as described earlier, is dissolved in toluene (175 mL). n-Butyllithium (38.0 mL of 2.5 M solution in hexanes, 95 mmol) is added carefully under vigorous stirring at room temperature to give a red solution. After one hour, a precipitate forms. The mixture is kept at room temperature overnight, and is then filtered and washed with toluene (100 mL) and then heptane (200 mL). The sticky product is dried under nitrogen in the glovebox and is collected and dried under vacuum.

A sample of the indeno[1,2-b]indolyl lithium salt produced above (10 g, 42 mmol) is dissolved in toluene (95 mL) to produce an orange slurry. Diethyl ether (35 mL) is added slowly to give an orange solution. This solution is added over 15 min. at room temperature with stirring to a slurry of cyclopentadienylzirconium trichloride (11 g, 42 mmol) in toluene (190 mL) and diethyl ether (190 mL). The mixture turns deep red and is kept at room temperature overnight. The slurry is filtered to recover a red solid, which is washed with toluene (200 mL) and dried under vacuum. Yield of complex 10: 16.5 g. The $^1$H NMR spectrum is consistent with the proposed structure:

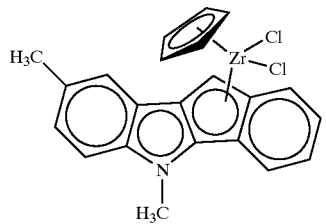

Preparation of Silica-Supported Complexes

Crossfield ES757 silica is calcined at 250° C. for 12 h. In a glove-box under nitrogen, a 30 wt. % solution of methylalumoxane (MAO) in toluene (0.8 mL) is slowly added to a sample (1.0 g) of the calcined silica at room temperature with efficient stirring. After the MAO addition is complete, stirring continues for 0.5 h. Volatiles are removed under vacuum (about 28.5 inches Hg, 1 hour) at room temperature. Yield: 1.25 g of MAO-treated silica.

Also in the glovebox, 30 wt. % MAO/toluene solution (1.18 mL) is added to an amount of organometallic complex (A, B, or C) equal to 0.11 mmol of transition metal. The resulting solution is added slowly at room temperature with stirring to the dry, MAO-treated silica described above. After stirring for an additional 0.5 h, the supported complex is dried under vacuum to give a supported complex (about 1.75 g).

Example 1 and Comparative Examples 2–3

Copolymerization of Ethylene and 1-Hexene

A one-liter, stainless-steel reactor is charged with 1-hexene (35 mL). Triisobutylaluminum (1.0 mL of 1.0 M solution in heptane, 1.0 mmol) and Armostat 710 fatty amine (1 mg, product of Akzo Nobel) in heptane solution (0.25 mL) are mixed in one sidearm of the injector. This mixture is then flushed into the reactor with nitrogen pressure and isobutane (about 450 mL). Hydrogen is added (10 dpsig from a 90-mL stainless-steel cylinder pressurized initially to 500 psig $H_2$) to the reactor, which is then pressurized with ethylene to 320 psig. The reactor contents are allowed to equilibrate at 80° C. The supported catalyst (30 mg) is loaded into the other injector arm and then flushed into the reactor with isobutane (100 mL) and nitrogen pressure. The polymerization proceeds for 0.5 h. The reactor is vented and the olefin polymer is collected and dried under vacuum at 60° C. prior to testing. Results of polymer testing appear in Table 1.

TABLE 1

Effect of Open Architecture on Polymer Density

| Ex. | Complex | Type | SCB | density (g/cm$^3$) | Mw | Mw/Mn |
|---|---|---|---|---|---|---|
| 1 | A | open architecture Ti [1,2-b[ complex | 30.3 | 0.889 | 784 K | 3.0 |
| C2 | B | bridged Zr [2,1-b] complex | 17.0 | 0.913 | 100 K | 3.1 |
| C3 | C | unbridged Zr [1,2-b] complex | 6.2 | 0.932 | 94 K | 2.8 |

SCB = short-chain branches per 1000 carbons as measured by FT-IR.

Example 4

Copolymerization of Ethylene and 1-Hexene

A one-liter, stainless-steel reactor is charged with 1-hexene (35 mL). Triisobutylaluminum (0.20 mL of 1.0 M solution in heptane, 0.20 mmol) is flushed into the reactor from one sidearm of the injector with isobutane (450 mL) and nitrogen pressure. The reactor is then pressurized with ethylene to 320 psig. The reactor contents are allowed to equilibrate at 80° C. The supported catalyst (34 mg of silica-supported complex A) is loaded into the other injector arm and then flushed into the reactor with isobutane (100 mL) and nitrogen pressure. The polymerization proceeds for 0.5 h. The reactor is vented and the olefin polymer is collected and dried under vacuum at 60° C. prior to testing. Activity: 6120 g polyolefin per g catalyst per hour. Mw/Mn (GPC)=2.44. Mw=1,180,000; intrinsic viscosity (by GPC): 9.57; short-chain branches per 1000 carbons (by FT-IR): 32.8; density: 0.888 g/cm$^3$.

Example 4 demonstrates the use of an open architecture indenoindolyl catalyst in a process of the invention for making ethylene copolymers. As shown in Table 1, the copolymers have very low densities, high molecular weight (even though hydrogen was present in the reactor), and narrow molecular weight distributions (2.8–3.0).

Preparation of Supported Catalyst D with Complex A and Borate Co-Catalyst

Grace Davison silica 955 is calcined at 250° C. for 12 h. In a glove-box under nitrogen, a 0.5 M solution of triethylaluminum (TEAL) in heptane (8 mL) is slowly added to 2 g of the calcined silica at room temperature with efficient stirring. After one hour stirring, the treated silica is dried by vacuum at room temperature.

Complex A (29 mg, 0.066 mmol), toluene (5 mL), and triphenylcarbenium tetrakis(pentafluorophenyl)borate [$(C_6H_5)_3CB(C_6F_5)_4$] (85 mg, 0.092 mmol) are mixed with a sample of the TEAL-treated silica (1.0 g) and the mixture is stirred for 0.5 h. Volatiles are removed under vacuum (about 28.5 inches Hg, 1 hour) at room temperature. Yield: 1.12 g of catalyst D.

Example 5

Copolymerization of Ethylene and 1-Hexene

A one-liter, stainless-steel reactor is charged with 1-hexene (35 mL). Triisobutylaluminum (0.20 mL of 1.0 M solution in heptane, 0.20 mmol) is flushed into the reactor from one sidearm of the injector with isobutane (450 mL) and nitrogen pressure. The reactor is then pressurized with ethylene to 320 psig. The reactor contents are allowed to equilibrate at 80° C. Supported catalyst D (20 mg) is loaded into the other injector arm and is then flushed into the reactor with isobutane (100 mL) and nitrogen pressure. The polymerization proceeds for 0.5 h. The reactor is vented and the olefin polymer is collected and dried under vacuum at 60° C. prior to testing. Activity: 2680 g polyolefin per g catalyst per hour. Mw/Mn (GPC)=2.32. Mw=923,360; intrinsic viscosity (by GPC): 8.1; short-chain branches per 1000 carbons (by FT-IR): 33.2; density: 0.882 g/cm$^3$.

Example 5 demonstrates the use of a borate-activated, open architecture indenoindolyl catalyst in a process of the invention for making ethylene copolymers with very low densities and high molecular weight.

Example 6

Preparation of an N—Si—N Bridged Complex

2-Methyl-5,6-dihydroindeno[1,2-b]indole (3.28 g) is suspended in ether (30 mL) and n-butyllithium (6.0 mL of a 2.5 M solution in hexane) is added. After one hour, this mixture is added dropwise to a solution of dimethyldichlorosilane (4.14 g) in ether (20 mL). The mixture is stirred for three hours and filtered. The filtrate is evaporated to give a beige solid (4.68 g). The residue is dissolved in ether (60 mL), and a mixture of t-butylamine (1.20 g) and n-butyllithium (6.0 mL of a 2.5 M solution in hexane) is added dropwise. After 2 h, the mixture is evaporated and the residue is extracted with pentane. The volume of the mixture is reduced to 30 mL, and n-butyllithium (12 mL of 2.5 M solution in hexane) is added. After stirring overnight, the yellow solid is collected by filtration, washed with pentane, and dried. Yield: 4.49 g. The product is dissolved in ether (100 mL) and methyllithium (18 mL of a 1.4 M solution in ether) is added. The mixture is cooled to −30° C. and TiCl$_4$(THF)$_2$ (4.15 g) is then added. After stirring for 2 hours, the mixture is filtered and the filtrate is evaporated. The residue is extracted with hot heptane (2×100 mL). Evaporation of the combined extracts gives a brown-black solid (2.00 g) having a $^1$H NMR spectrum consistent with the proposed structure:

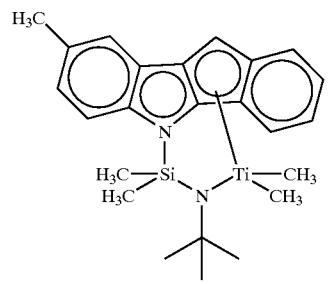

Example 7

Copolymerization Experiments

Ethylene is copolymerized with 1-hexene using an 8-cell Endeavor apparatus. Each cell is charged with a toluene solution containing 9.8×10$^{-5}$ mmoles of the open-architecture Ti complex from Example 6, MAO activator (1000 equivalents) and varying amounts of 1-hexene comonomer. The apparatus is pressurized with ethylene (200 psig) and polymerizations proceed for 30 minutes. The gas is vented and polymer is collected from each of the cells. Activities are listed in Table 2.

TABLE 2

Ethylene-Hexene Copolymerizations

| 1-hexene (mL) | 0 | 0.25 | 0.50 | 0.75 | 1.0 | 1.25 | 1.50 |
|---|---|---|---|---|---|---|---|
| toluene (mL) | 4.60 | 4.35 | 4.10 | 3.85 | 3.60 | 3.35 | 3.10 |
| activity (kg polymer per gram Ti per hour) | 26 | 22 | 19 | 17 | 13 | 11 | 3 |

Example 8

Open architecture indeno[1,2-b]indolyl complex 4 is prepared as described previously.

Example 9

The procedure of Example 8 is generally followed except that lithium 1,1,3,3-tetramethylbutylamide is used in place of lithium t-butylamide to yield open architecture indeno[1,2-b]indolyl complex 11.

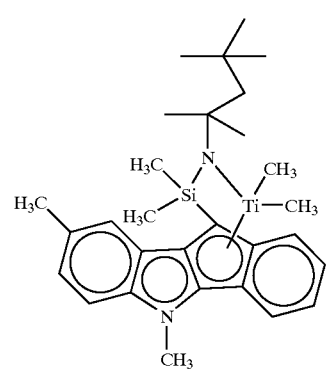

11

Comparative Example 10

Open Architecture Indeno[2,1-b]indolyl Complex 12

This compound was prepared from 2-indanone substantially according to the procedure detailed in PCT Int. Appl.

WO 01/53360 Example 1 to yield open architecture indeno[2,1-b]indolyl complex 12.

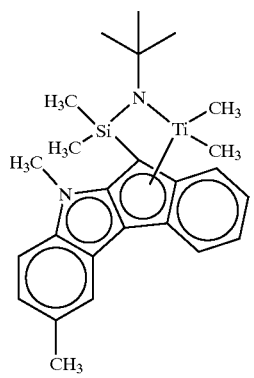

Example 12

Propylene Polymerization

A solution of complex and activator is prepared in an inert atmosphere dry box by mixing 5 mg of open architecture indeno[1,2-b]indolyl complex 4 from Example 8 with 3.5 mL of MAO (10% by weight solution of methylalumoxane in toluene) and 16.5 mL of toluene. This solution is allowed to age for 30 minutes before adding to the polymerization reactor.

To a 1-L, stainless-steel stirred reactor, at room temperature, is charged 400 mL of dry, oxygen-free propylene. Then 1.6 mL of a 25% by weight solution of triisobutylaluminum in heptane is flushed into the reactor with 50 mL of isobutane. The reactor is brought to 50° C. and allowed to equilibrate. Polymerization begins upon adding 1.0 mL of the solution of complex and activator and by flushing with 50 mL of isobutane. After 60 minutes of polymerization at 50° C., the reactor is vented to remove the remaining propylene and isobutane. The polymer is removed from the reactor, soaked overnight in 1 L of methanol, filtered, and dried. Activity: 2467 kg polypropylene per g titanium per hour. The weight average molecular weight and polydispersity (by GPC): $M_w$=736,000; $M_w/M_n$= 3.5. The polymer tacticity measured by $^{13}$C NMR is 7% mm triads (isotactic triads) and 59% rr triads (syndiotactic triads) showing that that the polypropylene is neither highly isotactic nor highly syndiotactic. The results indicate that the polypropylene has elastomeric properties.

Example 13

The polymerization of Example 12 is repeated to obtain polypropylene with Mw=683,000. The polypropylene is molded into ASTM type I tensile bars and the properties are measured. Tensile strength at break: 4.86 MPa; elongation at break: 550%. Tensile set at 200%: 8% (measured by extending the sample to 200% of the original length and holding the sample for ten minutes, followed by releasing the sample and then measuring the set after another ten minutes. A set of 0% indicates complete return to the original length while 100% would indicate no return from the elongated position). Stress recovery: 31%. (This is the decrease in sample stress at 200% elongation after ten minutes.)

These tensile properties demonstrate the good elastomeric properties of the polypropylene prepared by using indeno[1,2-b]indolyl complexes as catalyst components.

Examples 14 and 15 and Comparative Examples 16 and 17

Propylene Polymerizations

The polymerization procedure of Example 12 is generally followed with different complexes and polymerization temperatures. The conditions and results are listed in Table 3.

TABLE 3

Propylene Polymerizations

| Example | Complex | Polym. Temp. °C. | Activity | $M_w$/ 1000 | $M_w/M_n$ | mm | rr |
|---|---|---|---|---|---|---|---|
| 12 | 4 | 50 | 2467 | 736 | 3.5 | 0.07 | 0.59 |
| 14 | 4 | 70 | 2156 | 582 | 3.0 | 0.11 | 0.49 |
| 15 | 11 | 50 | 3392 | 944 | 2.9 | 0.13 | 0.46 |
| C16 | 12 | 50 | 300 | 1090 | 3.5 | 0.08 | 0.67 |
| C17 | 12 | 70 | 197 | 810 | 3.2 | 0.09 | 0.62 |

Examples 12, 14 and 15 show that polymerizations performed with open architecture indeno[1,2-b]indolyl complexes give about a tenfold improvement in activity versus the polymerizations in Comparative Examples 16 and 17 performed with the open architecture indeno[2,1-b]indolyl complexes. The polypropylene has high molecular weight and low polydispersity. The tacticity data shows that the polymers are neither highly isotactic nor highly syndiotactic. This level of tacticity is indicative of elastomeric polypropylene.

Preparation of Silica-Supported Complexes 4 and 12

Grace Davison 955 silica is calcined at 250° C. for 12 h. In a glove-box under nitrogen, a 30 wt. % solution of methylalumoxane (MAO) in toluene (0.8 mL) is slowly added to a sample (1.0 g) of the calcined silica at room temperature with efficient stirring. After the MAO addition is complete, stirring continues for 0.5 h Volatiles are removed under vacuum (about 28.5 inches Hg, 1 hour) at room temperature. Yield: 1.30 g of MAO-treated silica.

Also in the glovebox, 30 wt. % MAO/toluene solution (1.18 mL) is diluted with toluene (3.4 mL), and an amount of open architecture titanium complex (4 or 12) equal to 0.048 mmol of titanium is then added to the diluted MAO to form a solution. This resulting solution is then mixed with the dry, MAO-treated silica described above. After stirring for an additional 0.5 h, the supported complex is dried under vacuum to give a supported complex (about 1.80 g).

Example 18

Copolymerization of Ethylene and 1-Hexene Using Supported Complex 4

A one-liter, stainless-steel reactor is charged with 1-hexene (15 mL). Triisobutylaluminum (0.5 mL of 1.0 M solution in heptane, 0.5 mmol) and Stadis 425 fatty amine (12 mg, product of Akzo Nobel) in heptane solution (3.0 mL) are mixed in one sidearm of the injector. This mixture is then flushed into the reactor with nitrogen pressure and isobutane (about 400 mL). Hydrogen is added (300 dpsig from a 10-mL stainless-steel cylinder pressurized initially to 500 psig $H_2$) to the reactor, which is then pressurized with ethylene to 350 psig. The reactor contents are allowed to equilibrate at 80° C. Supported complex 4 (58 mg) is loaded into the other injector arm and then flushed into the reactor with isobutane (85 mL) and nitrogen pressure. The polymerization proceeds for 0.5 h. The reactor is vented and the olefin polymer is collected and dried. Activity: 1,650 kg polyolefin per g titanium per hour.

Comparative Example 19

Copolymerization of Ethylene and 1-Hexene Using Supported Complex 12

All procedures are repeated, except that supported complex 12 is used. Activity: 501 kg polyolefin per g titanium per hour.

Example 18 and Comparative Example 19 demonstrate the advantage of selecting a supported, open architecture, indeno[1,2-b]indolyl complex for making ethylene copolymers.

Example 20

Propylene Polymerization Using Supported Complex 4

To a 1-L, stainless-steel stirred reactor, at room temperature, 1.0 mL of 1.0M of triisobutylaluminum in heptane is flushed into the reactor with 450 mL of dry, oxygen-free propylene. The reactor is brought to 70° C. and allowed to equilibrate. Polymerization begins upon adding supported complex 4 (98 mg) by flushing with 50 mL of dry, oxygen-free propylene. After 30 minutes of polymerization at 70° C., the reactor is vented to remove the remaining propylene. The polymer is removed from the reactor and dried. Activity: 331 kg polypropylene per g titanium per hour.

Comparative Example 21

Propylene Polymerization Using Supported Complex 12

The polymerization of Example 20 is repeated, except that supported complex 12 is used. Activity: 79 kg polypropylene per g titanium per hour.

Example 20 and Comparative Example 21 demonstrate the advantage of selecting a supported, open architecture, indeno[1,2-b]indolyl complex for making polypropylene.

The preceding examples are meant only as illustrations. The following claims define the invention.

We claim:

1. A catalyst system which comprises:
   (a) an activator; and
   (b) a bridged indeno[1,2-b]indolyl Group 4–6 transition metal complex having open architecture.

2. The catalyst system of claim 1 wherein the activator is selected from the group consisting of alumoxanes, ionic borates, ionic aluminates, alkylaluminums, and aluminoboronates.

3. The catalyst system of claim 1 wherein the complex incorporates a Group 4 transition metal.

4. The catalyst system of claim 1 wherein the complex has the general structure:

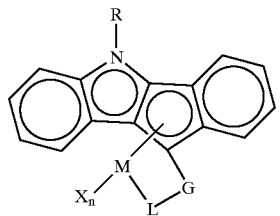

in which M is a Group 4–6 transition metal, G is a linking group, L is a ligand that is covalently bonded to G and M, R is alkyl, aryl, or trialkylsilyl, X is alkyl, aryl, alkoxy, aryloxy, halide, dialkylamino, or siloxy, and n satisfies the valence of M.

5. The catalyst system of claim 4 wherein M is a Group 4 transition metal, L is alkylamido, and G is dialkylsilyl.

6. The catalyst system of claim 4 wherein M is Ti or Zr, L is t-butylamido, G is dimethylsilyl, and X is halide or alkyl.

7. A silica-supported catalyst system of claim 1.

* * * * *